United States Patent [19]

Blume et al.

[11] Patent Number: 5,085,776
[45] Date of Patent: Feb. 4, 1992

[54] COMPOSITE MEMBRANES FOR FLUID SEPARATIONS

[75] Inventors: Ingo Blume, Hengelo, Netherlands; Klaus-Viktor Peinemann, Reinbeck, Fed. Rep. of Germany; Ingo Pinnau, Austin, Tex.; Johannes G. Wijmans, Menlo Park

[73] Assignee: Membrane Technology & Research, Inc., Menlo Park, Calif.

[21] Appl. No.: 647,748

[22] Filed: Jan. 31, 1991

Related U.S. Application Data

[63] Continuation of Ser. No. 516,181, Apr. 30, 1990, Pat. No. 4,990,255, which is a continuation of Ser. No. 361,024, Jun. 2, 1989, Pat. No. 4,931,181.

[51] Int. Cl.$^5$ .................. B01D 61/36; B01D 67/00
[52] U.S. Cl. .................. 210/500.27; 55/158; 210/649; 264/45.1; 264/48
[58] Field of Search .............. 210/490, 634, 640, 641, 210/644, 649–655, 500.1, 500.4, 500.27–500.29, 500.3–500.43; 264/41, 45.1, 48, DIG. 48, DIG. 62; 55/16, 158

[56] References Cited

U.S. PATENT DOCUMENTS 4,990,255  2/1991  Blume et al. .................. 210/500.27

*Primary Examiner*—Frank Sever
*Attorney, Agent, or Firm*—J. Farrant

[57] ABSTRACT

A method for designing and making composite membranes having a microporous support membrane coated with a permselective layer. The method involves calculating the minimum thickness of the permselective layer such that the selectivity of the composite membrane is close to the intrinsic selectivity of the perselective layer. The invention also provides high performance membranes with optimized properties.

15 Claims, 5 Drawing Sheets

5,085,776

COMPOSITE MEMBRANES FOR FLUID SEPARATIONS

This invention was made with Government support under Contract Number DE-AC-Ac07-83ID12379, awarded by the Department of Energy. The Government has certain rights in this invention.

This is a continuation of application Ser. No. 516,181, filed 4/30/90, now U.S. Pat. No. 4,990,255, which is a continuation of application Ser. No. 361,024, filed 6/2/89, now U.S. Pat. No. 4,931,181.

FIELD OF THE INVENTION

The present invention pertains to the field of separation membranes. More particularly, the invention concerns the optimization of the performance of composite membranes having a microporous support layer and a relatively thin selective layer. The membranes can be used in gas separation, vapor separation or pervaporation.

BACKGROUND OF THE INVENTION

Pervaporation is a low-pressure membrane process that can be used to separate components of differing volatilities from solutions. The membranes used are selectively permeable (permselective) to one component of the feed solution. Transport through the membrane is induced by maintaining the vapor pressure on the permeate side of the membrane lower than the vapor pressure of the feed mixture. The driving force for pervaporation is the difference in partial vapor pressure of each species across the membrane. One or more of the feed liquid components pass through the membrane in vapor form. The non-permeating fraction is removed as a liquid residue.

Gas separation is also a pressure-driven membrane process. In this case, a feed gas mixture at a certain pressure contacts one side of a permselective membrane and a lower pressure is maintained on the permeate side. The components of the mixture diffuse through the membrane under a potential gradient brought about the pressure drop across the membrane. Vapor separation is a type of gas separation application in which the feed gas contains organic vapors that are to be removed, typically, from air.

The optimum permselective membrane for use in any of these applications combines high selectivity with high flux. These two basic properties are determined by the membrane materials and the membrane thickness. As a general rule, high flux and high selectivity are mutually contradictory properties. Polymers with high selectivities for one component over another tend to be relatively impermeable; highly permeable materials on the other hand tend to be unselective. Thus the membrane-making industry has engaged in an ongoing quest for membranes with improved flux/selectivity performance.

One way to utilize highly selective materials and reduce the effect of low permeability is to make the membrane extremely thin. One way to minimize membrane thickness is to prepare a composite membrane consisting of a thin film coated onto a microporous support. Such a membrane is characterized on the basis of whether the coating or the support controls the separation properties. If the microporous support has a very high surface porosity, gas transport through the support will take place by convective flow and/or Knudsen diffusion through the pores. On the other hand, if the microporous support has a surface porosity less than about $10^{-4}$, most of the gas transport will take place by diffusion through the polymer phase, so that the support rather than the coating determines the separation properties. This is the case, for example, with the membranes described in U.S. Pat. No. 4,230,463, to Henis and Tripodi, which are now sold commercially under the name Prism ®. Membranes where the coating layer provides the separation properties are described, for example, by Ward et al. in "Ultrathin silicone rubber membranes for gas separation", *J. Membrane Sci.* 1, 99, 1976, by Riley et al. in "Development of ultrathin membranes", *Office of Saline Water Report No.* 386, PB# 207036, and in U.S. Pat. No. 4,553, 983 to Baker. In addition, there are numerous other references in the literature describing attempts to make ultrathin, defect-free membranes. Much of this work has been performed in the belief that the selectivity of the composite membrane will remain essentially the intrinsic selectivity of a thick film of the permselective material, but that the transmembrane flux will increase as the permselective layer is made thinner. Therefore, it is customary to ascribe any loss of selectivity observed with ultrathin membranes to defects in the permselective layer, through which unselective bulk transport of materials takes place.

SUMMARY OF THE INVENTION

The invention is a composite permselective membrane, optimized to give the best combination of flux and selectivity performance. The invention also covers a process for designing such a membrane. The membrane differs from previous membranes available to the art in that it is tailored by means of a model that shows that the membrane will possess a selectivity close to the intrinsic selectivity of the coating layer, only if the resistance to gas permeation of the composite structure is within the permselective coating layer. The model sets a limit on the minimum thickness for the permselective layer in relation to the permeability of the support.

The invention recognizes that, contrary to the standard teachings in the art, it is not desirable to make the permselective coating layer as thin as possible. The invention also recognizes, again contrary to previous teachings, that drops in performance observed as the permselective layer is made thinner may not necessarily arise from defects in the layer, as has been generally supposed, but rather may be inherent in the permselective layer/support combination. The invention recognizes that as the thickness of the permselective layer decreases, there comes a point at which the selectivity of the composite membrane inevitably starts to fall.

The present teachings also show that these effects are particularly noticeable and significant where the selectivity for the more permeable over the less permeable component is large, such as occurs in separation of organic vapors from air, or in separation of some organic solvents from water, for example.

It is an object of the invention to provide composite separation membranes optimized in terms of flux and selectivity performance.

It is an object of the invention to provide high performance membranes for use in gas separation, vapor separation or pervaporation applications.

It is an object of the invention to provide composite separation membranes wherein the selectivity of the composite is at least 70% of the intrinsic selectivity of the permselective layer.

It is an object of the invention to provide a method for determining the minimum thickness of the permselective layer of a composite membrane for optimum performance.

It is an object of the invention to provide a method for determining the minimum permeability of the support layer of a composite membrane for optimum performance.

Other objects and advantages of the invention will be apparent from the description of the invention to those of ordinary skill in the art.

It is to be understood that the above summary and the following detailed description are intended to explain and illustrate the invention without restricting its scope.

DETAILED DESCRIPTION OF THE INVENTION

Figure 1:
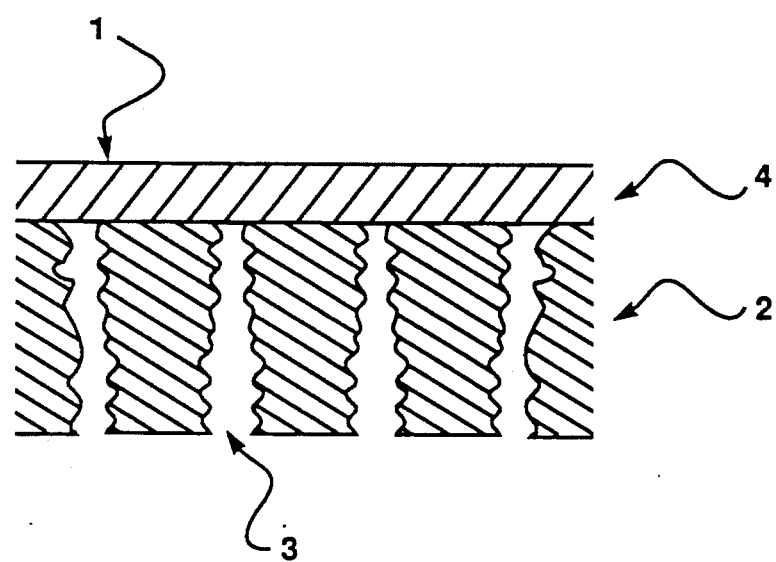
FIG. 1 is a schematic cross-section of a composite membrane having a microporous support layer and a very thin permselective coating layer.

The term permselective as use herein refers to polymers, or membranes made from those polymers, that exhibit selective permeation for at least one component in a fluid mixture over the other components of the mixture, enabling a measure of separation between the components to be achieved.

The term composite as used herein means comprising a support membrane and one or more coating layers.

The term intrinsic selectivity as used herein means the ratio of the permeability coefficients of a polymer material for two fluids, as measured with a sample of the mixed fluids permeating through thick isotropic films of the polymer material.

The term vapor as used herein refers to organic compounds in the gaseous phase below their critical temperatures.

Good permselective membranes combine high selectivity with high flux. These two basic properties are determined by the membrane materials and the membrane thickness. One way to minimize the membrane thickness is to make a composite membrane consisting of a thin film coated on a microporous support. Such membranes can be classified on the basis of whether the coating or the support controls the separation properties. If the microporous support has a high surface porosity, transport through the support will take place by convective flow or Knudsen diffusion through the pores. On the other hand, if the microporous support has a low surface porosity, typically about $10^{-4}$ or below, most transport will be by diffusion through the polymer phase. This invention is concerned only with composite membranes with high porosity supports. Previously it has been commonly assumed in the art that these composite membranes will exhibit increasing flux as the thickness of the permselective coating is reduced, and that the selectivity of the composite for two diffusing species will remain unchanged with changing membrane thickness. (See, for example, A. S. Michaels, "Fundamentals of Membrane Permeation", in *Membrane Processes for Industry*, Proceedings of a Symposium sponsored by Southern Research Institute, 1966.) We have found however that for these composite membranes the selectivity is also a function of membrane thickness. This unexpected result is due to the resistance of the microporous support layer. Although the permselective layer may be intrinsically many times less permeable than the support, as the permselective coating becomes very thin, the resistance to transport in this layer is reduced to the point where the resistance of the support is no longer insignificant, but can substantially affect the overall performance of the membrane. We have found theoretically, and confirmed experimentally, that for a given separation, support structure and permselective material, there is a limiting value at which the permselective layer has the optimum thickness. At this permselective layer thickness, the membrane has the maximum flux attainable without compromising selectivity. The selectivity of the composite is considered to be unacceptably compromised when it falls to a value 70% or less of the intrinsic selectivity of thick film of the permselective material.

A high-porosity-support composite membrane is shown in FIG. 1. Referring now to this figure, composite membrane, 1, comprises a microporous support layer, 2, containing surface pores, 3, through which fluid transport in the support layer primarily takes place. The support layer is coated with a very thin permselective layer, 4, which determines the separation properties of the membrane. A model that can be used to predict the separation behavior of the composite can be derived starting with the standard expression for resistances in series, $R = R_1 + R_2$. For a gas, A, the permeation rate through the membrane, $J_{(A)}$ can be written:

$$J_{(A)} = \Delta p \cdot \left( \frac{l_1}{P_{1(A)}} + \frac{l_2}{P_{2(A)}} \right)^{-1}, \quad (1)$$

where $\Delta p$ is the pressure difference across the membrane, $l_1$ is the thickness of the support layer, $l_2$ is the thicknesses of the permselective layer, $P_{1(A)}$ is the permeability coefficient of the support layer and $P_{2(A)}$ is the permeability coefficient of the permselective layer.

An equivalent expression can be written for a second gas, B. The selectivity, $\alpha_{A/B}$ of the composite for gas A over gas B can be expressed as the ratio of the permeation rates under equal pressure driving forces:

$$\alpha_{A/B} = J_{(A)}/J_{(B)} \quad (2)$$

Combining equations 1 and 2 gives:

$$\alpha_{A/B} = \frac{l_1/P_{1(B)} + l_2/P_{2(B)}}{l_1/P_{1(A)} + l_2/P_{2(A)}}, \quad (3)$$

It is apparent from this expression that the selectivity of the membrane is determined by both layers of the composite. Equations 2 and 3 are valid for gas mixtures if the permeability coefficient of one gas is not affected by the presence of the other.

When the resistance to gas permeation is essentially within the permselective layer, $$l_2/P_{2(A)} >> l_1/P_{1(A)} \tag{4a}$$

and $$l_2/P_{2(B)} >> l_1/P_{1(B)} \tag{4b}$$

so that Equation 3 reduces to:

$$\alpha_{A/B} = \frac{l_2/P_{2(B)}}{l_2/P_{2(A)}} = \frac{P_{2(A)}}{P_{2(B)}}. \tag{5}$$

which is the conventional belief of the art. However, as will be shown, this simplification cannot be made for high permeability, very thin membranes.

Figure 2:
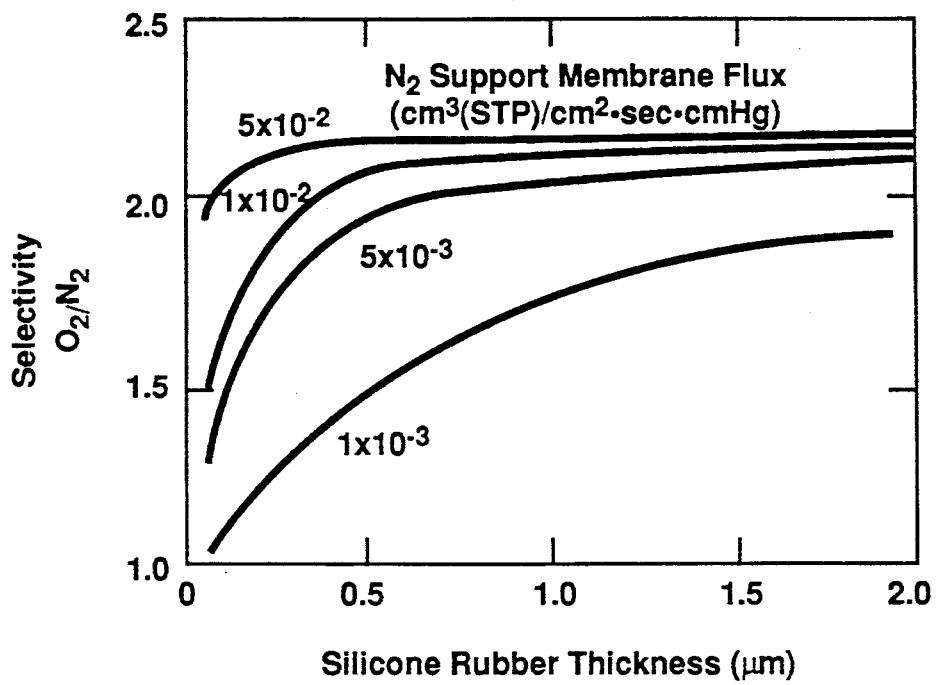
FIG. 2 is a graph of the theoretical $O_2/N_2$ selectivity of composite membranes having a permselective layer of silicone rubber and microporous supports of varying normalized nitrogen fluxes.

Equation 3 can be used to calculate the $O_2/N_2$ selectivity of a hypothetical composite membrane having permselective membranes of different thicknesses coated onto microporous supports with varying normalized nitrogen fluxes. For example, the nitrogen permeability coefficient of silicone rubber is about $270 \times 10^{-3}$ cm$^3$(STP)cm/cm$^2\cdot$s$\cdot$cmHg abd its $O_2/N_2$ selectivity is 2.2. FIG. 2 shows the $O_2/N_2$ selectivity of the composite membranes plotted against the thickness of the silicone rubber layer. Four different values for the normalized nitrogen flux, $P_{1(N2)}/l_1$ were used. It was assumed that the normalized oxygen flux $P_{1(O2)}/l_1$ through the support is the same as the nitrogen flux. This assumption can be made because the gas flow occurs by Knudsen diffusion and Poiseuille flow, so essentially no selectivity for oxygen over nitrogen would be expected. As FIG. 2 shows, the $O_2/N_2$ selectivity of the composite membrane increases with increasing silicone rubber thickness until the intrinsic selectivity of silicone rubber is approached at some optimum thickness. The value of this optimum thickness depends on the normalized flux of the support. For example, to achieve a selectivity for the composite of 2.0 (90% of the intrinsic selectivity of silicone rubber) with a silicone rubber thickness less than 1 micron requires that the support should have a normalized flux of not less than about $5 \times 10^{-3}$ cm$^3$(STP)/cm$^2\cdot$s$\cdot$cmHg. Thus our model can be used to calculate the optimum permselective membrane thickness for any separation and support material. Conversely the model can also be used to tailor the normalized flux of the support used to carry a permselective layer of a particular thinness.

Equation 3 can also be used to calculate the minimum thickness of the permselective layer when the selectivity of the composite is chosen to bear a specified relationship to the intrinsic selectivity of the permselective material. Thus:

$$\alpha_{A/B} = \frac{l_1/P_{1(B)} + l_2/P_{2(B)}}{l_1/P_{1(A)} + l_2/P_{2(A)}}, \tag{3}$$

Hence:

$$\alpha_{A/B}(l_1/P_{1(A)} + l_2/P_{2(A)}) = l_1/P_{1(B)} + l_2/P_{2(B)} \tag{6}$$

and $$l_2(1/P_{2(B)} - \alpha_{A/B}/P_{2(A)}) = l_1(\alpha_{A/B}/P_{1(A)} - 1/P_{1(B)}) \tag{7}$$

so that $$l_2 = l_1 \frac{(\alpha_{A/B}/P_{1(A)} - 1/P_{1(B)})}{(1/P_{2(B)} - \alpha_{A/B}/P_{2(A)})} \tag{8}$$

If the ratio of the desired selectivity to the intrinsic selectivity is K, this equation may also be written as:

$$l_2 = l_1 \frac{(K\alpha/P_{1(A)} - 1/P_{1(B)})}{(1/P_{2(B)} - K\alpha/P_{2(A)})} \tag{9}$$

Another use for Equation 3 is to develop tables that can then be used to calculate the preferred permselective membrane thickness for any support structure.

$$\alpha_{A/B} = \frac{l_1/P_{1(B)} + l_2/P_{2(B)}}{l_1/P_{1(A)} + l_2/P_{2(A)}}, \tag{3}$$

Because transport through the support layer is by pore flow, the resistance of the support membrane is approximately the same to all permeating species, thus $l_1/P_{1(A)} = l_1/P_{1(B)}$, and $$\alpha_{A/B} = \frac{l_1/P_{1(A)} + l_2/P_{2(B)}}{l_1/P_{1(A)} + l_2/P_{2(A)}}, \tag{10}$$

The intrinsic selectivity of the permselective material is the selectivity that would be achieved with thick films of the material and is therefore the ratio of the permeability coefficients in the material $P_{2(A)}/P_{2(B)}$. Dividing top and bottom by $l_2/P_{2(A)}$ therefore gives:

$$\alpha_{A/B} = \frac{1/R + \alpha}{1/R + 1}, \tag{11}$$

where R is the ratio of the resistances of the permselective layer and the support, $l_2/P_{2(A)}/l_1/P_{1(A)}$ to the more permeable species. Therefore:

$$\alpha_{A/B} = \frac{1 + R\alpha}{1 + R}, \tag{12}$$

or:

$$R = \frac{\alpha_{A/B} - 1}{\alpha - \alpha_{A/B}}, \tag{13}$$

This ratio becomes larger as the principal resistance to flow becomes centered in the permselective layer, i.e. $l_2/P_{2(A)}$ increases. The results of calculations for composite membranes having a permselective layer with an intrinsic selectivity of 2, 10 and 50 are listed in Table 1.

TABLE 1

| Relative Resistance to Flow of Component A $l_2/P_{2(A)}/l_1/P_1(A)$ | Membrane Selectivity | | |
|---|---|---|---|
| | Intrinsic Selectivity 2 | Intrinsic Selectivity 10 | Intrinsic Selectivity 50 |
| 2 | 1.67 | 7.0 | 33.7 |
| 4 | 1.80 | 8.2 | 40.2 |
| 6 | 1.83 | 8.7 | 43.0 |
| 8 | 1.89 | 9.0 | 44.6 |
| 10 | 1.91 | 9.2 | 45.5 |
| 12 | 1.92 | 9.3 | 46.2 |
| 20 | 1.95 | 9.6 | 47.7 |
| 100 | 1.99 | 9.9 | 49.5 |
| ∞ | 2.00 | 10.0 | 50.0 |

If for a particular separation the desired selectivity is at least 9.0 and the intrinsic selectivity is 10, then based on Table 1 the relative resistance of the layers for the more rapidly permeating species must be at least 8.0. The resistance of the support layer material can be determined by measuring the pressure normalized gas flux through an uncoated support. This will yield a value for $P_{1(A)}/l_1$. A representative value for $P_{1(A)}/l_1$ measured in this way might be $1 \times 10^{-3}$ cm$^3$(STP)/cm$^2$·sec·cmHg. Therefore the corresponding value of $P_{2(A)}/l_2$ is $1.25 \times 10^{-4}$ cm$^3$(STP)/cm$^2$·sec·cmHg. If the permeability coefficient is, for example, $1 \times 10^{-8}$ cm$^3$(STP)cm/cm$^2$·sec·cmHg, then the optimum thickness of the permselective coating will be 0.8 μm. Thus to determine the optimum thickness for the permselective layer of a composite membrane according to the invention requires the following steps to be performed:

1. Determine the intrinsic selectivity and permeability of the permselective material using thick films.
2. Determine the resistance to permeation of the support membrane by measuring the pressure normalized permeation rate through the uncoated support.
3. Choose the desired selectivity for the composite.
4. Using Equation 3, or a table prepared as Table 1, calculate the permselective layer thickness.

A similar series of steps can of course be carried out for a predetermined permselective membrane thickness to calculate the minimum permissible premeability of the support membrane.

The above discussion refers only to the permeation of gases through composite membranes. However it should be appreciated that the same arguments and teachings would apply for the separation of vapors from gases or from other vapors, or for the membrane process of pervaporation. The invention is intended to embrace membrane optimization methods and membranes for use in any of these applications.

Carrying out these optimizing steps, and then making a composite membrane accordingly, will provide a membrane that can exhibit the highest flux possible for that particular separation and combination of membrane materials without compromising the membrane selectivity. This optimization is valuable wherever high-porosity-support composite membranes are used. However the membranes and methods of the invention are particularly valuable in sitations where the intrinsic selectivity of the permselective material for one permeating species over another is very high, typically 20 or above. This may clearly be seen by referring back to Table 1. Consider the first line of the table, where the resistance of the support, at half that of the permselective layer, is substantial. If the intrinsic selectivity for the two permeating species is only 2, then the effect of the support will be to reduce the selectivity of the composite from a maximum possible value of 2 to an actual value of 1.67, a loss of performance of 16.5%. However if the intrinsic selectivity is 10, the selectivity of the composite is only 7, a loss of 30% in the selectivity performance. Likewise, when the intrinsic selectivity is 50, a loss of selectivity performance of almost 38% occurs. If the intrinsic selectivity for the two components is 2, a composite selectivity of 90% intrinsic selectivity can be reached when the ratio of the resistances is 4. If the intrinsic selectivity is 10, the resistance ratio must be 8 before the composite selectivity is 90% of the intrinsic value. If the intrinsic selectivity is 50, the resistance ratio must be at least 10 before the 90% level is reached.

Thus the invention provides a simple, but hitherto unrecognized, quantitative method to design composite membranes with thicknesses and permeabilities tailored for very high performance. The invention also provides membranes made in accordance with these teachings, and having the potential for high flux, combine with a selectivity close to the intrinsic selectivity of the permselective layer. Of course, membranes made according to the invention will only exhibit this performance if the permselective layer is defect free. Pinholes or cracks in the permselective coating will still permit bulk flow of gases or vapors through the support, reducing the selectivity, but this effect will be able to be distinguished from the inherent limitations of the composite structure. To achieve optimum performance, the operating parameters of the system incorporating the membrane, such as the pressure on the permeate side, the transmembrane pressure ratio, and the stage cut, etc., must also be considered. However, once again, these effects are a separate issue, and given that a viable system can be designed in terms of these parameters, the system will not be compromised by the inherent properties of the membrane.

When the desired selectivity, the permeability of the support, and the permselective membrane thickness have been chosen or calculated in accordance with the model, the composite membrane must be made. The membrane comprises a microporous support, onto which a very thin permselective layer is coated. A preferred support membrane is an asymmetric Loeb-Sourirajan type membrane, which consists of a relatively open, porous substrate with a thin, dense, finely porous skin layer. Preferably the pores in the skin layer should be less than 1 micron in diameter, to enable it to be coated with a defect-free permselective layer. The substrate portion of the microporous layer can and should have a porosity preferably not less than about 20%, and more preferably about 70% or above. The skin layer should be more finely porous, with a lower porosity, to facilitate coating with the permselective material. Nevertheless, the porosity of the skin layer should preferably be not less than about 1%. Alternatively, simple isotropic microporous supports may be used. The resistance of the support layer compared with the resistance of the permselective layer should be such that the composite membrane can possess a selectivity not less than 70%, preferably not less than 80% and most preferably not less than 90, of the intrinsic selectivity of the permselective material. To achieve a selectivity of 90% the intrinsic value will require the support resistance to be about 0.25 that of the permselective layer if the intrinsic selectivity is 2, 0.125 if the intrinsic selectivity is 10, and 0.1 if the intrinsic selectivity is 50, for example. To achieve a composite selectivity of 80% of the intrinsic value will require the support resistance to be about 0.5 that of the permselective layer if the intrinsic selectivity is 2, and about 0.25 if the intrinsic selectivity is greater than about 10. To achieve a composite selectivity of 70% of the intrinsic value will require the support resistance to be about equal to that of the permselective layer if the intrinsic selectivity is about 2, and about 0.5 for higher intrinsic selectivities. Representative polymers which may be used for the support include polysulfone, polyimides, polyamides, polyetherimide, polyvinylidene fluoride, polyethylene, polypropylene, polyethersulfone or polytetrafluoroethylene. The material used for the support membrane should be capable of resisting the solvents used in applying the permselective layer. If the polymer material used for the permselective layer is soluble only in aggressive solvents, such as toulene, methylene chloride, or tetrahydrofuran, a solvent resistant support material, such as polyimide or polysulfone, is desirable. Suitable solvent-resistant polysulfone or polyimide membranes for use as supports may be purchased commercially. They are available as ultrafiltration membranes, for example, the NTU ® 4220 (crosslinked polyimide), or NTU ® 3050 (polysulfone) from Nitto Electric Industrial Company, Osaka, Japan. The thickness of the support membrane is not critical, since its permeability is high compared to that of the permselective layer. However the thickness would typically be in the range 100 to 300 microns.

Optionally, the support membrane may be reinforced by casting it on a fabric web. The multilayer membrane then comprises the web, the microporous membrane, and the ultrathin permselective membrane. The web material may be, for example, a polyester such as Hollytex, available from Eaton-Dikeman, Mt. Holly Springs, Pa. The permselective layer could not be cast directly on the fabric web, because it would penetrate the web material, rather than forming an unbroken surface coating.

As an alternative to making the support membranes in flat sheet form, they may be spun as hollow fibers. The preparation of hollow fibers is well known in the art, and is described, for instance, by B. Baum et al., "Hollow Fibers in Reverse Osmosis, Dialysis and Ultrafiltration", in *Membrane Separation Processes*, P. Meares, Ed., Elsevier, 1976.

The material used for the permselective layer will vary, depending on the separation to be performed. Materials that could be used for the permselective layer include, for example, silicon rubber, chlorosulfonated polyethylene, polysilcone-carbonate copolymers, fluoroelastomers, plasticized polyvinylchloride, polyurethane, polybutadiene, polystyrene-butadiene copolymers, styrene/butadiene/styrene block copolymers, polyacetylene, substituted polyacetylene, polyether/polyamide block copolymers, polymethylpentene, ethylcellulose, cellulose acetate and the like. The multilayer membrane may conveniently be formed in continuous rolls by casting and coating as described, for example in U.S. Pat. No. 4,553,983, incorporated herein by reference. Typically, the membranes are prepared in two steps. To form the microporous support membrane, a casting solution, consisting of the polymer dissolved in a water-miscible solvent, is doctored onto the moving web. The belt passes into a water bath which precipitates the polymer to form the microporous membrane. The belt is then collected on a take-up roll, after which the membrane is washed to remove any remaining solvent, dried to form the membrane, and wound up on a roll. In a second step, the microporous membrane from the feed roll passes through a dip-coating station, then a drying oven and is wound up on a product roll. The dip-coating tank contains a dilute solution of the polymer and coats the traveling microporous membrane with a liquid layer. After evaporation of the solvent, a very thin polymer film is left on the membrane.

Alternatively, the permselective membrane may be cast by spreading a thin film of the polymer solution on the surface of the water bath. After evaporation of the solvent, the permselective layer may be picked up onto the microporous support. This method is more difficult in practice, but may be useful if the desired support is attacked by the solvent used to dissolve the permselective material.

The thickness of the permselective layer will be tailored in accordance with the teachings of the invention, and will depend on the separation to be performed, the intrinsic selectivity of the permselective layer, and the permeability of the support. Typically for gas separations the thickness of the permselective layer may be 10 $\mu$m or less. For vapor separation from air, or for pervaporation of some organic solvents from water, however, where the organic/non-organic selectivity is very high, it may be necessary to use a comparatively thick permselective layer, 10–20 $\mu$m thick or even greater, if the selectivity is not to be compromised. The teachings of the invention are especially useful in these circumstances, because the potential for previously unexplained loss of selectivity is much greater.

The invention is now further illustrated by the following examples, which are intended to be illustrative of the invention, but are not intended to limit the scope or underlying principles of the invention in any way.

EXAMPLES

EXAMPLE 1

Composite Membrane Preparation

Asymmetric support membranes were made from polysulfone by the Loeb-Sourirajan precipitation method. A casting solution, consisting of polysulfone in a water-immiscible solvent, was doctored onto a moving belt of polyester non-woven paper. The belt was then passed to a cold-water bath which precipitated the polymer to form the support membrane. After the support has been washed and dried, the properties were measured in a commercial test cell (Millipore Corp., Bedford, Mass.) using membrane stamps of area 12.6 cm$^2$. Based on measurements with pure gas streams, the support had a normalized nitrogen flux, $P_{1(N2)}/l_1$, of $1.5 \times 10^{-2}$ cm$^3$(STP)/cm$^2$·s·cmHg, and an oxygen/nitrogen selectivity of 0.95. The support membranes were coated with silicone rubber solutions of varying thicknesses. After evaporation of the solvent, permselective silicone rubber layers of varying thicknesses were formed on the support structure.

EXAMPLE 2

Gas Separation Oxygen/Nitrogen

Gas permeation studies were carried out for composite membranes with many different silicone rubber thicknesses. The permeation properties were measured in a test cell as above, using membrane stamps of area 12.6 cm$^2$. The steady state permeation rates at 50 psig and 22° C. were measured with bubble flow meters. As before, the measurements were made with pure gases.

Figure 3:
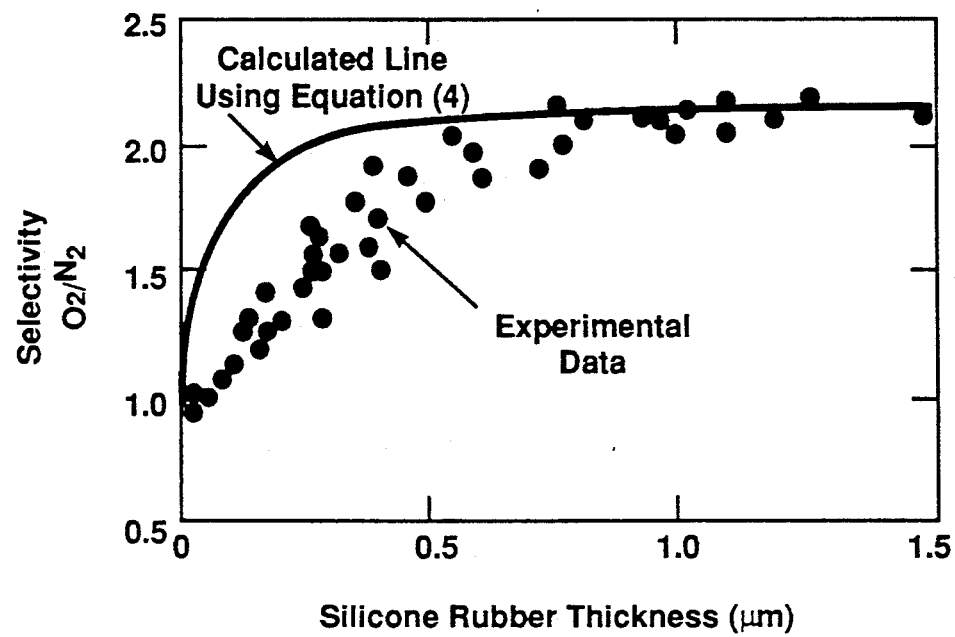
FIG. 3 is a graph plotting the $O_2/N_2$ selectivity performance of composite membranes with silicone rubber permselective layers of varying thicknesses.

The results are shown in FIG. 3. The solid line was calculated using Equation 3. According to the experimental data, a silicone rubber thickness of 1 $\mu$m is necessary to obtain from the composite the intrinsic selectivity of silicone rubber for oxygen/nitrogen which is about 2.2. This experimental minimum thickness is an agreement with the model prediction. The deviations from the model at silicone rubber thickness less than about 0.5 $\mu$m may be due to defects in the coating or to plugged pores in the support.

EXAMPLE 3

Gas Separation Carbon Dioxide/Nitrogen

Experiments as in Examples 1 and 2 were carried out for carbon dioxide and nitrogen. The uncoated microporous support membrane had a normalized carbon dioxide flux, $P_{1(CO2)}/l_1$, of $1.4 \times 10^{-2}$ cm$^3$(STP)/cm$^2 \cdot$s$\cdot$cmHg and a carbon dioxide/nitrogen selectivity of 0.93.

The carbon dioxide permeability coefficient of silicone rubber is $3.1 \times 10^{-7}$ cm$^3$ (STP)cm/cm$^2 \cdot$s$\cdot$cmHg, and the intrinsic selectivity for carbon dioxide over nitrogen is 11.5.

Figure 4:
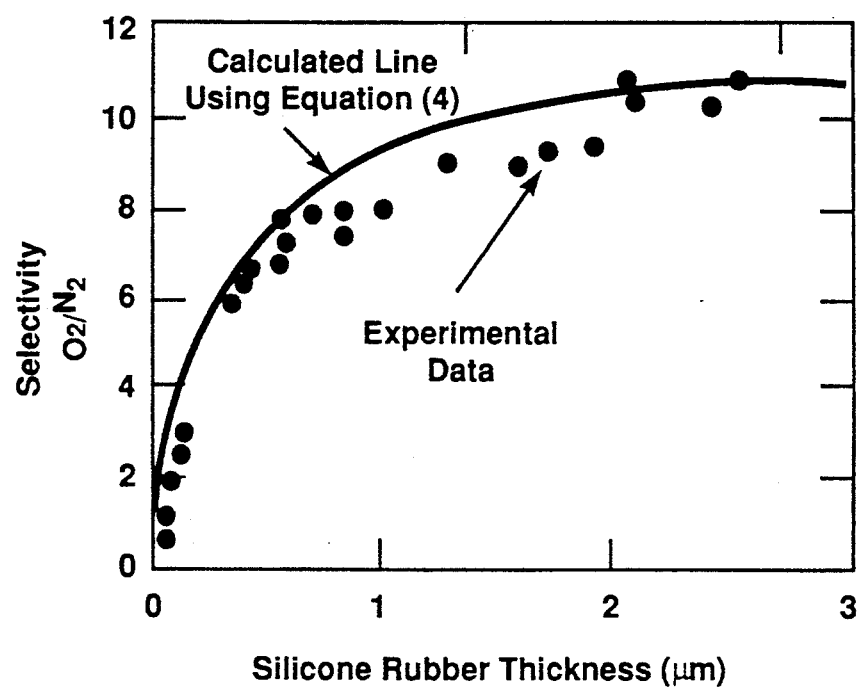
FIG. 4 is a graph plotting the $CO_2/N_2$ selectivity performance of composite membranes with silicone rubber permselective layers of varying thicknesses.

The results of the permeation experiments for the composite membrane are shown in FIG. 4. The solid line was calculated using Equation 3. As predicted by the model, because silicone rubber is much more permeable to carbon dioxide than to nitrogen, the influence of the support is more significant. In this case, selectivities close to the intrinsic selectivity of silicone rubber were not obtained until the permselective layer was at least 2 $\mu$m thick. That this effect was not due to defects in the thinner membranes was checked by measuring the selectivity of the same membranes with oxygen/nitrogen. The oxygen/nitrogen selectivity for all membrane above 0.5 $\mu$m thick was greater than 2, confirming that the membranes are essentially defect-free.

EXAMPLE 4

Vapor Separation

Experiments similar to those of Examples 1 and 2 were carried out for the separation of tetrachlorethylene from nitrogen. In a preliminary experiment with a thick isotropic film of silicone rubber, the intrinsic selectivity for tetrachlorethylene over nitrogen was foundd to be 50.

Figure 5:
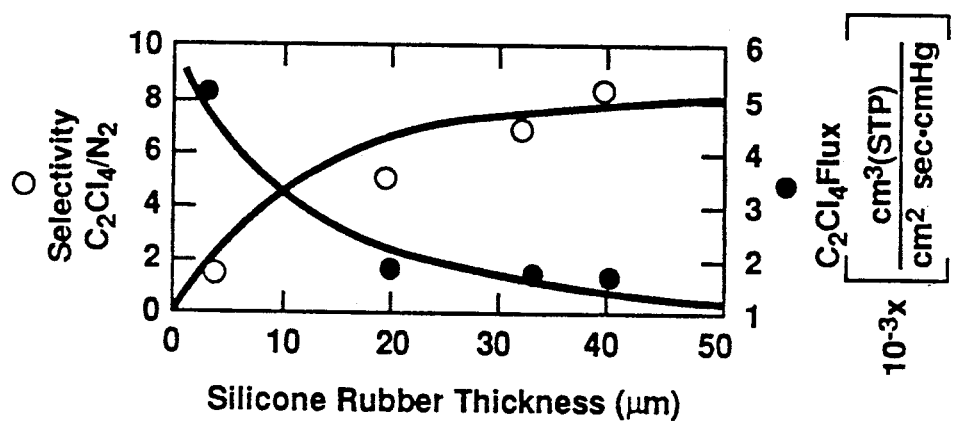
FIG. 5 is a graph plotting the $C_2Cl_4/N_2$ selectivity and $C_2Cl_4$ flux with silicone rubber permselective layers of varying thicknesses.

In this case of the properties of the composite membranes were tested in spiral-wound membrane modules with an effective membrane area of 1,500 cm$^2$. All modules used in the experiments showed an oxygen/nitrogen selectivity of 2.0–2.2, and were thus essentially defect-free. The silicone rubber thicknesses used were 5.0, 4, 6.5 and 8 $\mu$m. These thicknesses were calculated from nitrogen permeation rates for the uncoated and the coated membranes. The performance of the modules with tetrachlorethylene/nitrogen mixtures is shown in FIG. 5. The solid lines were calculated from the model, equations 1 and 3. As can be seen, there was good experimental agreement with the model for both flux and selectivity. Although the membranes were defect-free, the intrinsic selectivity was never obtained, even when the permselective layer was 8 $\mu$m thick. Because silicone rubber is very permeable to tetrachlorethylene, the resistance of the support was comparable with the resistance of the permselective layer.

The normalized nitrogen fluxes obtained from the gas mixture experiments were the same as those from the pure gas measurements. It appeared, therefore, that no plasticization of the membranes by the organic vapor was occurring.

We claim:

1. A composite separation membrane comprising a two-layer composite of a support membrane layer and a permselective membrane layer, said composite separation membrane being prepared by a process comprising:
   (a) providing a support membrane layer characterized by permeation rates $P_{1(A)}/l_1$ respectively of components A and B of a fluid mixture, wherein $l_1$ is the thickness of the support membrane layer and $P_{1(A)}$ and $P_{1(B)}$ are the permeabilities to components A and B;
   (b) providing a permselective material characterized by permeabilities $P_{2(A)}$ and $P_{2(B)}$ respectively to said components A and B, and by intrinsic selectivity $\alpha$;
   (c) determining an appropriate selectivity $\alpha_{A/B}$ for said composite separation membrane for component A over component B;
   (d) determining a thickness $l_2$ for said permselective membrane layer which satisfies the relationship:

$$\alpha_{A/B} = \frac{l_1/P_{1(B)} + l_2/P_{2(B)}}{l_1/P_{1(A)} + l_2/P_{2(A)}};$$

(e) coating said support membrane layer with said permselective material to create a permselective membrane layer of thickness $l_2$.

2. The composite separation membrane of claim 1, wherein $\alpha_{A/B}$ is at least 70% of the intrinsic selectivity $\alpha$ of said permselective material.

3. The composite separation membrane of claim 1, wherein said intrinsic selectivity $\alpha$ of said permselective material is at least 10.

4. The composite separation membrane of claim 1, wherein said support membrane layer is made from a polymer chosen from the group consisting of polysulfone, polyimides, polyamides, polyetherimide, polyvinylidene fluoride, polyethylene, polypropylene, polyethersulfone and polytetrafluoroethylene.

5. The composite separation membrane of claim 1, wherein said permselective material is chosen from the group consisting of silicone rubber, chlorosulfonated polyethylene, polysilicone-carbonate copolymers, fluoroelastomers, plasticized polyvinylchloride, polyurethane, polybutadiene, polystyrene-butadiene copolymers, styrene/butadiene/styrene block copolymers, polyacetylene, substituted polyacetylene, polyether/polyamide block copolymers, polymethylpentene, ethylcellulose and cellulose acetates.

6. A composite separation membrane comprising a two-layer composite of a support membrane layer and a permselective membrane layer, said composite separation membrane being prepared by a process comprising:
   (a) providing a support membrane layer characterized by permeation rates $P_{1(A)}/l_1$ and $P_{1(B)}/l_1$ respectively of components A and B of a fluid mixture, wherein $l_1$ is the thickness of the support membrane layer and $P_{1(A)}$ and $P_{1(B)}$ are the permeabilities to components A and B;
   (b) providing a permselective material characterized by permeabilities $P_{2(A)}$ and $P_{2(B)}$ respectively to said components A and B, and by intrinsic selectivity $\alpha$;
   (c) determining an appropriate thickness $l_2$ for said permselective membrane layer;
   (d) determining a selectivity $\alpha_{A/B}$ for said composite separation membrane for component A over component B, which selectivity satisfies the relationship:

$$\alpha_{A/B} = \frac{l_1/P_{1(B)} + l_2/P_{2(B)}}{l_1/P_{1(A)} + l_2/P_{2(A)}};$$

(e) coating said support membrane layer with said permselective material to create a composite separation membrane characterized by selectivity $\alpha_{A/B}$.

7. The composite separation membrane of claim 6, wherein $\alpha_{A/B}$ is at least 70% of the intrinsic selectivity $\alpha$ of said permselective material.

8. The composite separation membrane of claim 6, wherein said intrinsic selectivity $\alpha$ of said permselective material is at least 10.

9. The composite separation membrane of claim 6, wherein said support membrane layer is made from a polymer chosen from the group consisting of polysulfone, polyimides, polyamides, polyetherimide, polyvinylidene fluoride, polyethylene, polypropylene, polyethersulfone and polytetrafluoroethylene.

10. The composite separation membrane of claim 6, wherein said permselective material is chosen from the group consisting of silicone rubber, chlorosulfonated polyethylene, polysilicone-carbonate copolymers, fluoroelastomers, plasticized polyvinylchloride, polyurethane, polybutadiene, polystyrene-butadiene copolymers, styrene/butadiene/styrene block copolymers, polyacetylene, substituted polyacetylene, polyether/polyamide block copolymers, polymethylpentene, ethylcellulose and cellulose acetates.

11. A composite separation membrane comprising a two-layer composite of a support membrane layer and a permselective membrane layer, said composite separation membrane being prepared by a process comprising:
  (a) providing a permselective material characterized by permeabilities $P_{2(A)}$ and $P_{2(B)}$ respectively to components A and B of a fluid mixture and by intrinsic selectivity $\alpha$;
  (b) determining an appropriate thickness $l_2$ for said permselective membrane layer;
  (c) determining an appropriate selectivity $\alpha_{A/B}$ for said composite separation membrane for said component A over said component B;
  (d) determining the value of R which satisfies the equation:

$$R = \frac{\alpha_{A/B} - 1}{\alpha - \alpha_{A/B}},$$

wherein R is the ratio $l_2/P_{2(A)}/l_1/P_{1(A)}$, $l_1$ is the thickness of the support membrane layer, and $P_{1(A)}$ is the permeability of the support membrane layer to said component A;
  (e) determining the permeation rate $P_{1(A)}/l_1$ of said support membrane layer from the value of R that has been determined in step (d);
  (f) providing a support membrane layer characterized by permeation rate $P_{1(A)}/l_1$;
  (g) coating said support membrane layer with said permselective material to create a composite separation membrane characterized by selectivity $\alpha_{A/B}$ and permselective membrane layer thickness $l_2$.

12. The composite separation membrane of claim 11, wherein $\alpha_{A/B}$ is at least 70% of the intrinsic selectivity $\alpha$ of said permselective material.

13. The composite separation membrane of claim 11, wherein said intrinsic selectivity $\alpha$ of said permselective material is at least 10.

14. The composite separation membrane of claim 11, wherein said support membrane layer is made from a polymer chosen from the group consisting of polysulfone, polyimides, polyamides, polyetherimide, polyvinylidene fluoride, polyethylene, polypropylene, polyethersulfone and polytetrafluoroethylene.

15. The composite separation membrane of claim 11, wherein said permselective material is chosen from the group consisting of silicone rubber, chlorosulfonated polyethylene, polysilicone-carbonate copolymers, fluoroelastomers, plasticized polyvinylchloride, polyurethane, polybutadiene, polystyrene-butadiene copolymers, styrene/butadiene/styrene block copolymers, polyacetylene, substituted polyacetylene, polyether/polyamide block copolymers, polymethylpentene, ethylcellulose and cellulose acetates.

* * * * *

UNITED STATES PATENT AND TRADEMARK OFFICE
CERTIFICATE OF CORRECTION

PATENT NO. : 5,085,776
DATED : February 4, 1992
INVENTOR(S) : Ingo Blume, Klaus-Viktor Peinemann, Ingo Pinnau, Johannes G. Wijmans It is certified that error appears in the above-indentified patent and that said Letters Patent is hereby corrected as shown below:

On the front page of the patent, please insert:

--Notice: The portion of the term of this patent subsequent to February 5, 2008 has been disclaimed.--

Signed and Sealed this

Fifth Day of September, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,085,776
DATED : February 4, 1992
INVENTOR(S) : Ingo Blume, Klaus-Viktor Peinemann, Ingo Pinnau, Johannes G. Wijmans It is certified that error appears in the above-indentified patent and that said Letters Patent is hereby corrected as shown below:

Figure 5 should appear as follows:

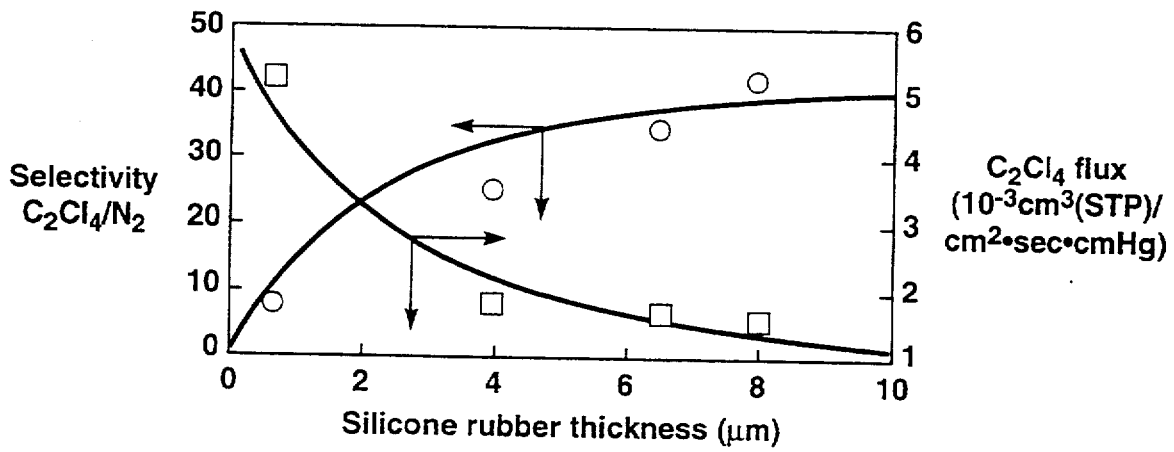

FIG. 5